United States Patent [19]

Wendorf

[11] Patent Number: 5,333,135
[45] Date of Patent: Jul. 26, 1994

[54] IDENTIFICATION OF A DATA STREAM TRANSMITTED AS A SEQUENCE OF PACKETS

[75] Inventor: James W. Wendorf, Cortlandt Manor, N.Y.

[73] Assignee: North American Philips Corporation, New York, N.Y.

[21] Appl. No.: 11,936

[22] Filed: Feb. 1, 1993

[51] Int. Cl.$^5$ .............................................. H04J 3/26
[52] U.S. Cl. ..................................... 370/94.1; 370/99
[58] Field of Search ....................... 370/94.1, 94.2, 99

[56] References Cited

U.S. PATENT DOCUMENTS 4,998,245  3/1991  Tanaka et al. ..................... 370/95.1

OTHER PUBLICATIONS

"The Datacycle Architecture"; Communications of the ACM, by Bowen, Gopal, Hickey, Lee, Mansfield, Raitz and Weinrib; Dec. 1992. vol. 35, No. 12, pp. 71–81.
EIA-516, "Joint EIA/CVCC Recommended Practice for Teletext" North American Basic Teletext Specification (May, 1988).

Primary Examiner—Douglas W. Olms
Assistant Examiner—Min Jung
Attorney, Agent, or Firm—David R. Treacy

[57] ABSTRACT

The contents of a digital data file, interspersed as packets of data in a bit stream containing entertainment signals and/or other data files, are quickly identified without a high system overhead for identification of each packet. The data file is divided into packets, and sequential groups of packets making up the file are identified as segments. The first packet of each segment has a prefix containing a service identification number, a block number, a segment number, and possibly segment length information, followed by data contents. The following packets of the segment have only the service identification number and block number, followed by the data contents. Where the file data are transmitted repeatedly, often without change in many segments, receiver processing time or power can be greatly reduced by including a version number or toggle bit in the segment prefix, so that a receiver can ignore the unchanged data.

22 Claims, 3 Drawing Sheets

IDENTIFICATION OF A DATA STREAM TRANSMITTED AS A SEQUENCE OF PACKETS

BACKGROUND OF THE INVENTION

1. Field of the Invention

The invention relates to the transmission of digital data containing packets of data from differing data files and applications; and more particularly to identification of the packets forming a particular data file which is transmitted as a data stream interspersed with packets of data which are part of other data streams, all being transmitted serially over one channel or band.

Modern high capacity transmission techniques make it possible to combine signals for entertainment, such as radio and television programs; auxiliary data associated with a television channel such as closed captioning, menu services and teletext; and data files. The various signals are combined, for example by time-division multiplexing, onto one channel. Most of these signals are not repeated; each receiver looks for synchronizing codes or preambles, for bit clock, byte and frame or packet synchronization, and then starts receiving or processing the signals of interest.

Although the transmitter or transmission medium imposes some standardization constraints on the various information signals or data streams, different data or program materials may differ widely in their information transmission rate or coding techniques. Usually all packets being transmitted over one channel have the same length, and the transmitter bit rate is constant. Differences in the information transmission rate are accommodated by controlling the interval between packets of one signal or data file. However, the invention is equally applicable where bit rates or packet lengths are variable.

Also, because of the very high transmitter bit rate, many receivers cannot decode or use a packet of data as it is being received. Instead, the receiver stores all or part of the packet for decoding or use during the interval before the next packet of this information signal or data file. Therefore it may be necessary to maintain a minimum interval between packets belonging to one file or program. Such a minimum interval, if required, may have any duration, including a duration less than one packet. These different requirements mean that the location of the next packet in a file may not be predictable, and as a result each packet must carry some identification.

Providing and decoding packet identification and synchronizing signals may impose a hearty overhead burden on the system. The burden appears particularly hearty with respect to data files which have a low information rate per unit of time, and therefore transmit only a small amount of data per packet.

Another problem arises in transmission of data files which some or all receivers desirably should be able to receive and process shortly after they start receiving, even though the data file content has not changed since a prior transmission. Such a data file may be, for example, a system channel map with codes and data relating to the bitstream contents.

2. Description of the Prior Art

Identification and synchronization methods or protocols are desirably matched to the basic organization or syntax of the system. In some program delivery systems, all data or information streams in the transmitted bit stream are organized into packets of fixed length. The packet then becomes the basic unit for synchronization and identification above the bit level. In such a system a common practice is to provide full identification in a preamble portion of each packet; or identification codes or addresses are divided into portions, and successive portions are transmitted in successive packets for that file or program. Similar techniques are used for transmission of teletext, for example as described in standard EIA-516, "Joint EIA/CVCC Recommended Practice for Teletext: North American Basic Teletext Specification (May, 1988).

When packets are transmitted with at least a minimum time interval between the successive packets constituting that program or file, synchronization to the desired packets has required either excessive time to complete identification and synchronization, or transmission of a lengthy identification field in the preamble of each packet.

The overhead burden has not been reduced when efficient organization involves dividing a data stream into successive segments, each containing a plurality of packets. Packets of one segment of one data stream may be interleaved with packets of segments of other data streams. The situation becomes even more involved when segments of different data streams have different numbers of packets, and the segments are transmitted with different cycle times, so that a given receiver must treat the identification and synchronization process as though there were a completely random interleaving of segments of the other files or program material with the segments to be selected. Long, specific identification codes have then been required for each packet.

When a data file is transmitted with a cycle time which is shorter than the typical time between changes in the content of the file, such as commonly occurs with directories or channel maps, processing power of the receiver may be diverted from other activities, with a resultant loss of performance, to store and decode a version of a file which has already been received and stored or acted on.

A related technique in the transmission of large data files is described in Bowen, Gopal, Hickey, Lee, Mansfield, Raitz and Weinrib, "The Datacycle Architecture", Communications of the ACM, Dec. 1992, vol. 35, no. 12, pp. 71-81.

SUMMARY OF THE INVENTION

An object of the invention is to identify data file packets for a selected file quickly, in the absence of complete identification in the preamble of each packet.

Another object of the invention is to minimize the length of identification fields transmitted in each packet.

Yet another object of the invention is to provide identification of each segment of the selected file.

A further object of the invention is to minimize the processing burden for receivers when files are transmitted repeatedly.

According to the invention, in a method of transmitting data packets, the datastream constituting a given data file is divided into packets, and successive groups of packets form segments into which the file is divided. A service identification number and a block number are inserted as the first portion of each packet containing data from a particular data file. The service identification number is unique to and identifies that file, while the block number identifies the packer's position in its segment.

The first packet of each segment, typically numbered as block "0", contains additional identification information. Preferably this information includes the segment number, a field which defines the length (number of packets) of that segment, and the number of bytes in the last packet or block.

In the above paragraph and throughout this application, the term data packet may be used to refer to the contents (data) portion of the packet, or to the entire packet including the identification portion which is inserted before the contents portion. Preferably the data packets all have a same standard length. As a result, the contents portion of the first packet of each segment will be shorter than that of the remaining packets of the segment, because of the extra identification information.

The invention thus makes it possible to identify the location of any byte in the file, via its segment number, packet number, and position within the packet. Even though each following packet (any packet not the first of its segment) contains no identification of the segment it is part of, it is not necessary for a receiver to wait until the beginning of a segment to start reading or decoding data. This can represent a significant saving if the segments are relatively long, and if the system provides a relatively long inter-packet time to allow processors to decode or process data from one packet before receipt of the next.

If, for example, a particular receiver uses all the data in the data file, immediately upon detecting a service identification (SID) prefix which matches a file to be used, the block number and contents portion of the packet can be stored for decoding. At this point the real meaning of the data will probably be unclear, because the receiver cannot tell which segment it is receiving. Each following packet will be detected, and its block number and contents stored, until detection of a block "0". This signals the start of the next segment, and is preferably followed immediately by the segment number. If segments are transmitted in a known order, then upon receipt of that next segment number, the receiver can determine what was the segment number of the packets just received, and therefore can complete decoding and use of the data contained therein.

As soon as one complete set of packets has been received, a full data file is available for use, even though reception has not covered one chronological cycle from block "0" of the first segment to the end of the last segment.

In a further preferred embodiment of the invention, the identification portion of the first packet of each segment additionally includes a version code, which enables the receiver to determine whether or not the data previously received are still valid or current. To permit this decision to be reached as early as possible, one embodiment inserts a version toggle bit immediately following the segment number. The sign or value of this bit is changed whenever the data of that segment have been changed or up-dated since the last transmission of that segment.

Another type of multi-bit version code is a version number. This is particularly useful if reception has been imperfect, and a possibility exists that the version toggle bit of the previous cycle of reception was not correctly received. Comparison of the currently received version number with that of the last stored segment provides confirmation that the stored version should or should not be changed.

Because the version number is available once per segment, decoding and processing of the full data file may not be required when only one segment is changed. This can release significant processing power of the receiver for other uses.

DESCRIPTION OF THE PREFERRED EMBODIMENT

The preferred embodiment of the invention is an improvement to a system which has been proposed by MPEG for the transmission of entertainment and data signals. Each packet consists of 126 8-bit bytes plus its prefix and redundancy check.

Figure 1:
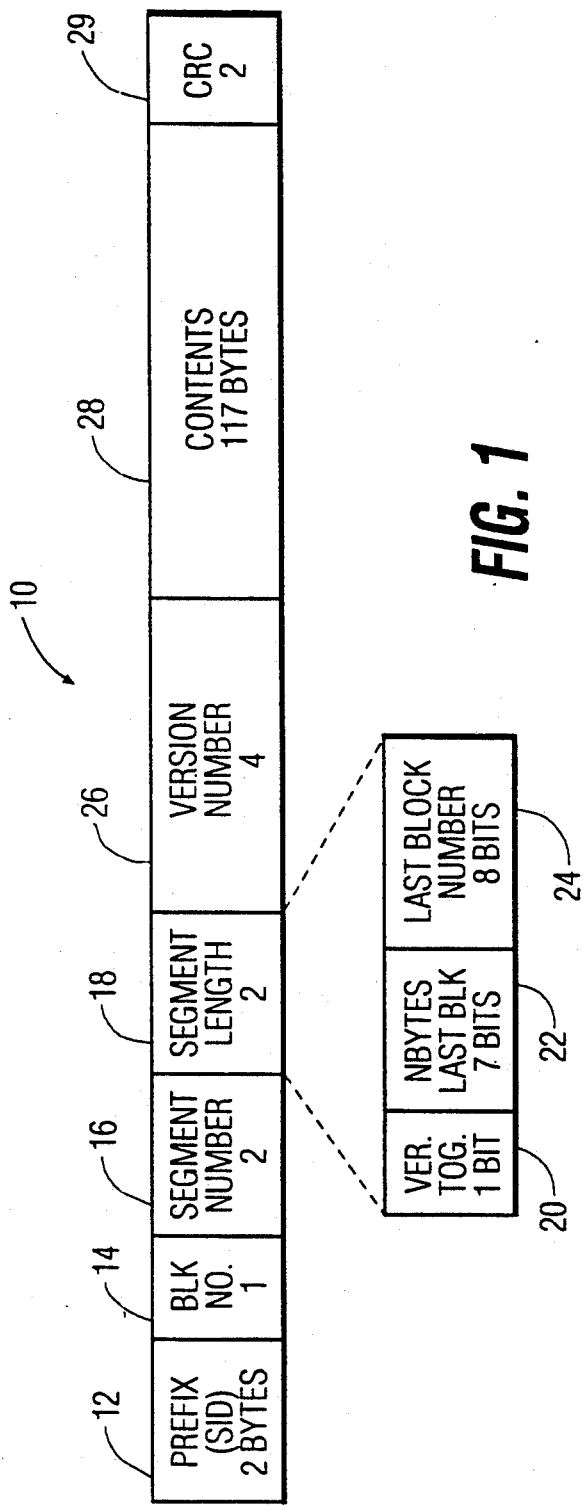
FIG. 1 is a diagram of the format of the first packet of a segment according to the invention.

As shown in FIG. 1, the first packet 10 of a data segment starts with a service identification number (SID) prefix 12 which is 2 bytes long. Four of these bits are used for other purposes, thus permitting identification of up to 4096 datastreams in the band or channel. A block number 14, one byte long, follows immediately after the SID 12, thus allowing a segment to contain up to 256 packets. The packet of FIG. 1, being the first of the segment, is identified as block 0. The next two bytes are a segment number field 16, thus permitting a file to contain up to 65,536 segments.

The segment number is followed by a segment length field 18, which again is two bytes long. The first bit 20 of the first of these bytes is a version toggle bit, whose value (1 or 0) is changed each time the contents of this segment of the file is changed with respect to the contents of the immediately previous transmission. The remaining 7 bits of this byte provides a number 22 which is the number of bytes in the last block (packet) of this segment. The second byte 24 of the field 18 is the number of the last block of the segment, which thereby identifies the length of the segment.

According to this embodiment of the invention, the segment length field is followed by a four byte long version number field 26 whose use is application dependent. The version number may simply be incremented each time the segment undergoes a change of contents, or some other coding may be used.

The version number field is followed by a contents field 28 which, for the first packet of a segment, is only 117 bytes long. The packet then ends with a 16 bit cyclic redundancy check (CRC) field 29 covering the 126 bytes from the block number field through the contents. It is preferably generated according to CCITT recommendation V.41, using the polynomial $x^{16}+x^{12}+x^5 1$.

Figure 2:
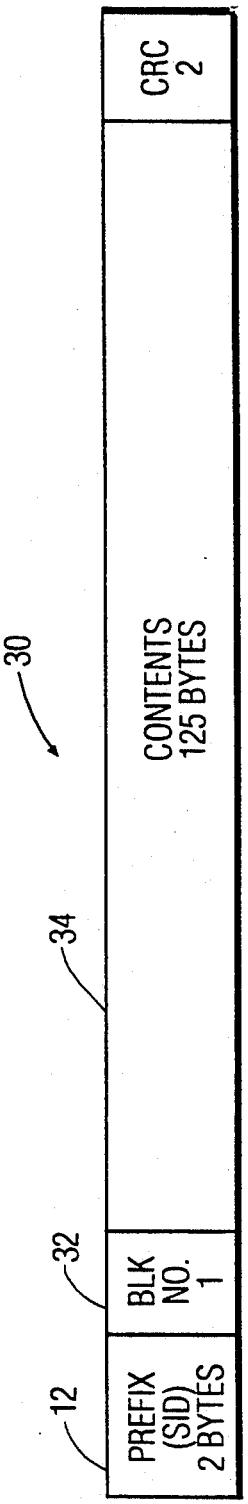
FIG. 2 is a similar diagram of the following packets of that segment.

The following packets 30 of each segment have the format of FIG. 2. These packets start with a prefix 12 identical to that of FIG. 1, followed by a block number field 32 which is the same as field 14 except that the number will be greater than 0. There are no segment or version identifier fields, so the block number is followed by a 125 byte contents field 34. As in the first packet, the following packets end with a CRC field 29.

The segments of a particular file need not be transmitted in sequence; however, because following packets in a segment do not contain any segment identification, blocks from different segments must not be interleaved. Preferably the packets are transmitted in block number order with no gaps in the numbering, so that there can be no uncertainty whether or not a packet was missed because of a transmission error.

Data Receiver

Figure 3:
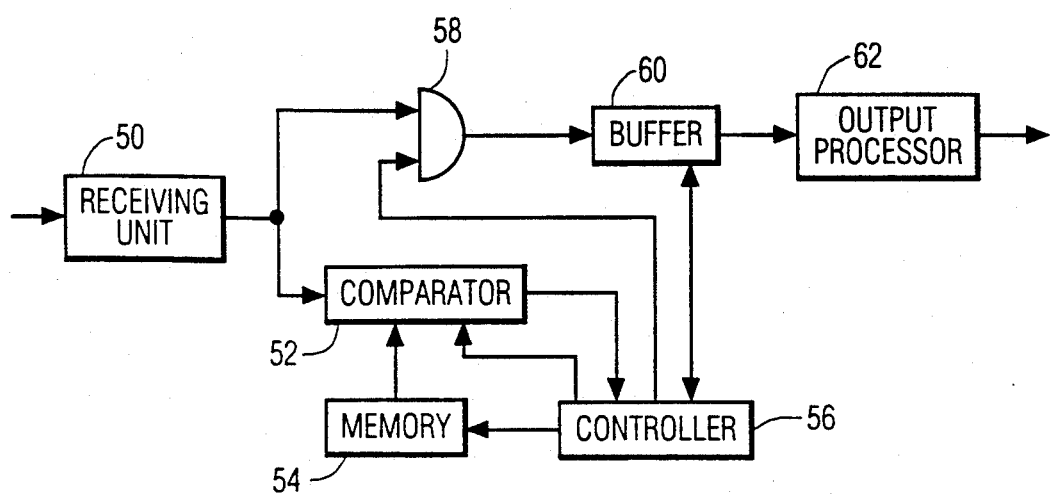
FIG. 3 is a block diagram of a data receiver according to the invention.

FIG. 3 shows the principal modules of a data receiver for utilizing a datastream having the format described above.

A receiving unit 50 may be a receiver for UHF or higher frequency bands broadcast by satellite, or for signals transmitted over a cable link such as a fiber optic link, or transmitted some other way, or might receive broad band signals which have been stored for future use. In the present embodiment the unit 50 receives either satellite broadcast or cable signals. The receiving unit 50 has a digital bit stream output coupled to a comparator 52 which compares bits or bytes of the bit stream with bits or bytes from a memory 54. The memory 54 stores the SID for each data file to be received and used or processed, the respective last version toggle value and segment number for each segment which has been received, and the block numbers of packets which are to be used or evaluated.

A controller 56 controls all the application-specific functions, such as selecting the value in the memory 54 against which the incoming bit stream is to be tested. Whenever a packet has been identified in the comparator as being part of a data file which is to be utilized, the controller enables a gate 58 for all fields or bytes of the packet which should contain data to be used by the application. Those fields or bytes are then passed to a buffer 60 for storage until sufficient information and time are available to process the raw or encoded data stored in the buffer. An output processor 62 then decodes or otherwise processes the raw data stored in the buffer and provides output signals to a using device such as a television receiver, personal computer, or printer.

Figure 4:
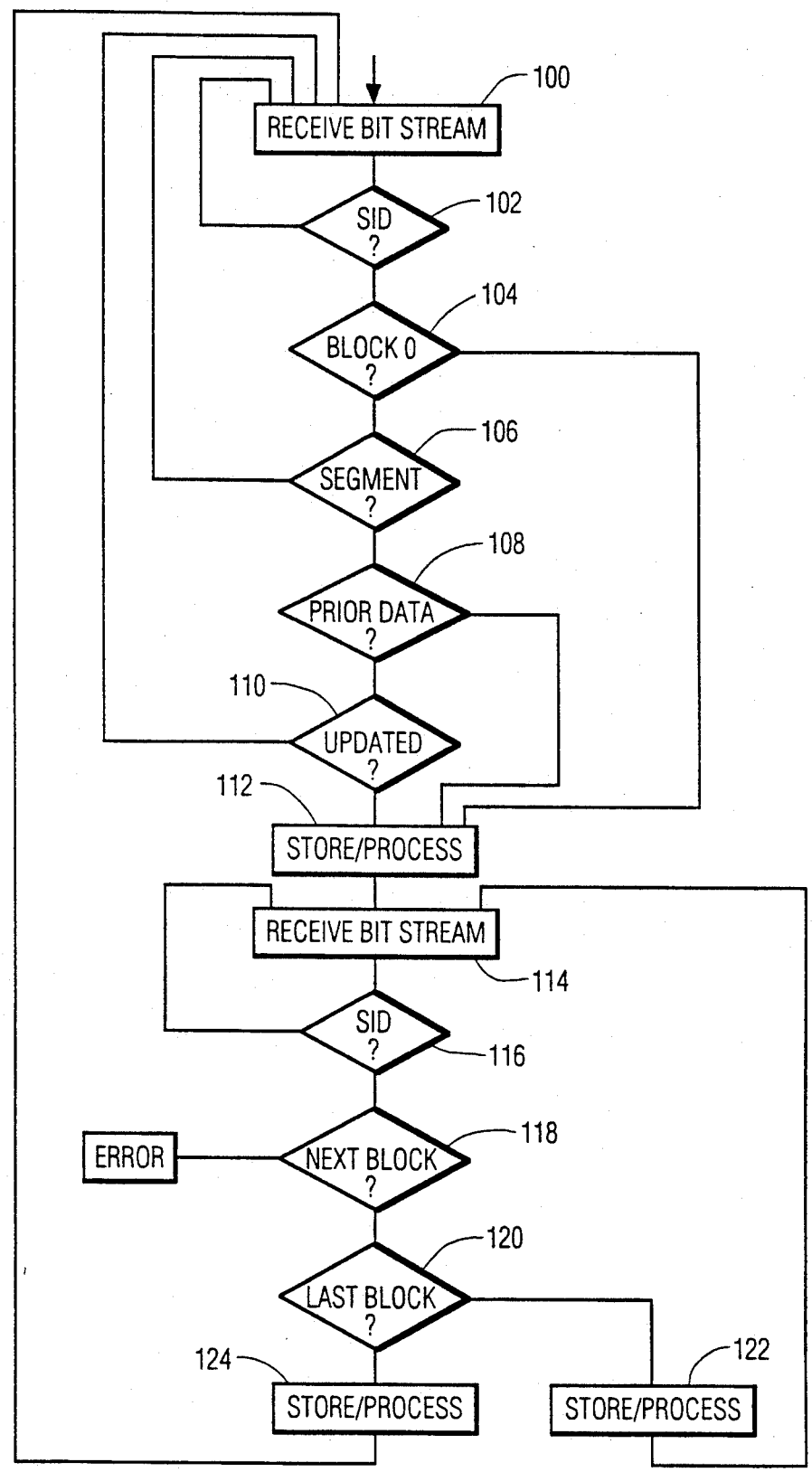
FIG. 4 is a flow chart showing steps in storage and use of data being received.

The logic diagram of FIG. 4 shows the operation of the receiver of FIG. 3, and particularly the controller 56, in greater detail. This diagram does not show every decision point which might be included in a practical program as detailed for a particular application, especially with respect to error recovery or reliability of reception, but illustrates the preferred technique of performing the invention.

The receiving step of box 100 represents the continuing receipt of a signal and outputting of a raw bit stream for identification, decoding or use. A packet synchronization method, of any known kind, is used to enable the comparator for only the prefix fields of each packet. In box 102 the comparator tests for presence of the desired service identification in the prefix of each packet. Upon identification of the prefix as matching the SID of a file to be utilized, in step 104 the block number is tested to determine whether this is the first or a following packet of a segment. If the block number is 0, then in step 106 the immediately following segment number is tested to determine if this segment of the file contains data to be used. If yes, then in step 108 the presence of a prior received version in the buffer 60 is checked. If there is one, then in step 110 the version toggle bit, which follows the segment number in the bit stream, is tested against the stored value, and if it is unchanged, the receiver recycles to await the next segment. If no version has been stored in the buffer, or the version toggle is changed, then the segment length data including the Last Block Number and the packet data contents (or selected bytes) and their block number are stored in step 112 for future processing.

If in step 104 the block number was not 0, then the packet is a following packet, the controller jumps to step 112, and the block number and packet data contents (or selected bytes) are stored. Logical processes to determine the segment number later, when more data have been received, are not specifically described herein but will be easily devised by those of ordinary skill in the art.

After receipt and storage of that packer's contents, in step 114 the receiving unit reverts to receiving the bit stream and, in step 116, testing the prefix of each packet received after the minimum interval (which may be zero) between packets. Of course, if a receiver is looking for data from more than one file, it may be required to examine the next packet to determine if its SID identifies another file of interest. Thus storage and parallel processing of different data files is possible if the receiver has sufficient computing capability.

Upon again identifying the desired SID, in step 118 the immediately following block number is tested to determine if it is the next block number in sequence; that is, it is compared with the block number stored in step 112 but incremented one unit. Failure of the comparison is an error condition; the particular application needs will determine what action is to be taken. If the block number tested in step 118 is correct, then in step 120 it is tested against the Last Block Number (if any) stored in step 112. If the just-received block number is less than the Last Block Number, then in step 122 the just-received block number is stored, and the packet contents are stored, and the receiver recycles to step 114.

If the just-received block number equals the Last Block Number, then in step 124 the block number and packet contents (or selected bytes) are stored for future processing, and the receiver recycles to step 100 to await receipt of block 0 of the next segment.

Other variations

Those of ordinary skill in the art will recognize that many variations of the embodiments described will fall within the scope of the claimed invention. For example, when the file is one which is frequently repeated, instead of skipping storage and processing of contents every time that the version toggle bit shows no change, every certain number of times the receiver may continue and compare the version number as in field 26 of FIG. 1, with that previously stored, to double check that the one being used is the lastest version being transmitted. As a still further check of the validity of the stored data from the file, on a periodic basis all or some of it can be compared with that being received even though the version toggle bit or the version number indicate no change.

Error checking will usually be included, and may be of any type, but is not critical to the practice of the invention.

Where the application makes transmission of segment length information redundant, these fields can be omitted from the first packet of each segment.

What is claimed is:

1. A method of transmitting and receiving data packets from one datastream which constitutes a given data file that is time-division multiplexed with packets representing other information, comprising:

dividing said one datastream into a sequence of file packets, dividing said sequence of file packets into a plurality of segments, each segment including at least one said file packet from said sequence, the file packets of a given segment being successive packets within said sequence, including in the first-transmitted packet of each segment a respective first series of bits containing identifying information, said first series including a service identification portion identifying said given data file, a block number representing the position of that packet as the first-transmitted packet of that segment, and a respective segment number representing the position of that segment within said plurality of segments, including, in each other packet of each segment, only one respective second series of bits containing identifying information, said second series consisting of a service identification portion identifying said given data file and a respective block number representing the position of that packet within said segment, and transmitting said plurality of segments serially, each of said data packets being separated from other data packets of said file by at least a given interpacket time greater than zero, and all the respective file packets of each respective segment being transmitted prior to transmission of the first packet of the next segment transmitted.

2. A method as claimed in claim 1, wherein each of said packets has a same fixed length, and said data packets are transmitted in the order of appearance within said sequence.

3. A method as claimed in claim 2, wherein said data packets are transmitted repeatedly, characterized in that said series of bits containing identifying information in the first-transmitted packet of each segment comprises a multi-bit version code whose value is changed whenever the data of that segment differs from the data transmitted in the previous corresponding segment.

4. A method as claimed in claim 3, wherein said data packets are transmitted at a variable packet rate, and said packets from other data streams are transmitted at other variable packet rates, whereby two successive data packets are separated by a varying number of said packets from other data streams.

5. A method as claimed in claim 4, characterized in that each said respective series of first and second bits consists of a maximum of 24 bits including a service identification code number forming said service identification portion and the respective block number.

6. A method as claimed in claim 1, wherein said data packets are transmitted at a variable packet rate, and said packets from other data streams are transmitted at other variable packet rates, whereby two successive data packets are separated by a varying number of said packets from other data streams.

7. A method as claimed in claim 1, characterized in that each said respective series of first and second bits consist of a maximum of 24 bits including a service identification code number forming said service identification portion and the respective block number.

8. A method as claimed in claim 1, wherein said data packets are transmitted repeatedly, characterized in that said series of bits containing identifying information in the first-transmitted packet of each segment comprises a version toggle bit whose value is changed whenever the data of that segment differs from the data transmitted in the previous corresponding segment.

9. A method as claimed in claim 1, wherein said data packets are transmitted repeatedly, characterized in that said series of bits containing identifying information in the first-transmitted packet of each segment comprises a version number which is incremented whenever the data of that segment differs from the data transmitted in the previous corresponding segment.

10. A method of transmitting and receiving data packets from one datastream which constitutes a given data file that is transmitted repeatedly and is time-division multiplexed with packets representing other information, comprising:

dividing said one datastream into a sequence of file packets;

dividing said sequence of file packets into a plurality of segments, each segment including at least one said file packet from said sequence, the file packets of a given segment being successive packets within said sequence, including in the first-transmitted packet of each segment a respective first series of bits containing identifying information, said first series including a given service identification portion identifying said given data file, a block number representing the position of that packet as the first-transmitted packet of that segment, a respective segment number representing the position of that segment within said plurality of segments, and a multi-bit code value which is changed whenever the data of that segment differs from the data transmitted in the previous corresponding segment, including in each other packet of each segment a respective second series of bits containing identifying information, said second series comprising a service identification portion the same as said given service identification portion and a respective block number representing the position of that packet within said segment, and transmitting said plurality of segments serially, all the respective file packets of each respective segment being transmitted prior to transmission of the first packet of the next segment transmitted.

11. A method as claimed in claim 9, wherein each of said packets has a same fixed length, and said data packets are transmitted in the order of appearance within said sequence.

12. A method as claimed in claim 11, wherein said data packets are transmitted repeatedly, characterized in that said multi-bit code value comprises a version toggle bit whose value is changed whenever the data of that segment differs from the data transmitted in the previous corresponding segment.

13. A method as claimed in claim 11, wherein said data packets are transmitted repeatedly, characterized in that said multi-bit code value comprises a version number which is incremented whenever the data of that segment differs from the data transmitted in the previous corresponding segment.

14. A method as claimed in claim 11, wherein said data packets are transmitted repeatedly, characterized in that said multi-bit code value comprises a version toggle bit whose value is changed whenever the data of that segment differs from the data transmitted in the previous corresponding segment, followed by a version number which is incremented whenever the data of that segment differs from the data transmitted in the previous corresponding segment.

15. An apparatus for receiving and processing data file packets from one datastream representing a given data file which is divided into a sequence of contents portions of file packets, some of said data file packets being transmitted repeatedly, said sequence of contents portions being divided into a plurality of segments, each segment including at least one said file packet having one said contents portion, the first-transmitted file packet of each segment containing a respective first contents portion and a respective first series of bits containing identifying information, said first series including a given service identification portion identifying said given data file, a block number representing the position of that packet as the first-transmitted packet of that segment, a respective segment number representing the position of that segment within said plurality of segments, and a multi-bit version code which is changed whenever the data of that segment differs from the data transmitted in the previous corresponding segment;

each other packet of each segment of said datastream including a respective contents portion and one respective following-packet series of bits containing identifying information, said following-packet series comprising one said given service identification portion identifying said given data file and a respective block number representing the position of that packet within said segment, respective file packets of each respective segment being transmitted in block number order, said data file packets being time-division multiplexed with packets representing other information and transmitted as a bit stream, said apparatus comprising:

means for receiving said bit stream, synchronizing and comparison means for identifying said given service identification portion of the first-received packet of said sequence of file packets, means, responsive to identification of said given service identification portion, for comparing the respective block number with a first value indicative of a first-transmitted packet of a segment, means, responsive to said block number equalling said value, for storing a second value which is at least a portion of said multi-bit version code, and for identifying subsequently received data packets of said given data file by said given service identification portion and block number only, and processing said data packets.

16. An apparatus as claimed in claim 15, comprising means, responsive to said block number of the first-received packet not equalling said first value, for storing at least a portion of said data contents portion of said first-received packet without complete processing at least until receipt of the first-transmitted packet of the next segment.

17. An apparatus as claimed in claim 16, characterized by comprising the means for identifying the respective series of bits containing identifying information in each following received packet of said given data file, and for comparing the respective block number with a given number, and means, responsive to at least the respective segment number of the first first-transmitted data packet to be received, for determining the actual segment number for the data packets received prior to receipt of said first first-transmitted data packet, means, responsive to the value of said actual segment number, for selectively controlling processing of values stored from selected packets of said data file.

18. An apparatus as claimed in claim 16, comprising means, responsive to receipt of identification of a first-transmitted data packet of a segment corresponding to one previously received, for comparing said multi-bit version code with the stored second value and, responsive to this comparison indicating that data of that segment does not differ from the data transmitted in the previous corresponding segment, inhibiting storing and processing of the data contents of the packets of said segment corresponding to one previously received.

19. An apparatus as claimed in claim 15, comprising means for comparing said segment number with a given number and, responsive to that comparison of said segment number with a given number, for inhibiting storing of at least a portion of said respective contents portion in at least one of the subsequently-received packets of that segment.

20. An apparatus as claimed in claim 15, comprising means, responsive to the comparison of said block number with a given number by said means for comparing, for inhibiting storing of said at least a portion of said contents portion.

21. An apparatus as claimed in claim 20, comprising means, responsive to receipt of identification of a first-transmitted data packet of a segment corresponding to one previously received, for comparing said multi-bit version code with the stored second value and, responsive to this comparison indicating that data of that segment does not differ from the data transmitted in the previous corresponding segment, inhibiting storing and processing of the data contents of the packets of said segment corresponding to one previously received.

22. An apparatus as claimed in claim 21, wherein said multi-bit version code comprises a single bit version toggle, and means for storing stores the previously received toggle value, and said means for comparing and inhibiting comprises a first gate receiving said bit stream and the stored toggle value for comparing these values, a second gate receiving an output of the first gate, and timing and logic means for enabling the second gate when the version toggle bit of the corresponding segment of said given data file is being received.

* * * * *